United States Patent
Sharma et al.

(10) Patent No.: US 11,995,042 B1
(45) Date of Patent: May 28, 2024

(54) FAST RECOVERY FOR REPLICATION CORRUPTIONS

(71) Applicant: Dell Products L.P., Round Rock, TX (US)

(72) Inventors: Mukesh Kumar Sharma, Pune (IN); Murthy V Mamidi, Queen Creek, AZ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/153,339

(22) Filed: Jan. 11, 2023

(51) Int. Cl.
| | |
|---|---|
| G06F 7/00 | (2006.01) |
| G06F 11/14 | (2006.01) |
| G06F 16/16 | (2019.01) |
| G06F 16/174 | (2019.01) |
| G06F 16/178 | (2019.01) |

(52) U.S. Cl.
CPC ........ *G06F 16/178* (2019.01); *G06F 11/1469* (2013.01); *G06F 16/164* (2019.01); *G06F 16/1748* (2019.01); *G06F 2201/84* (2013.01)

(58) Field of Classification Search
CPC .. G06F 16/178; G06F 16/164; G06F 16/1748; G06F 16/184; G06F 16/1844; G06F 16/27; G06F 16/275
See application file for complete search history.

(56) References Cited

U.S. PATENT DOCUMENTS

| | | | | |
|---|---|---|---|---|
| 7,870,356 | B1 * | 1/2011 | Veeraswamy | G06F 3/067 711/100 |
| 9,304,889 | B1 * | 4/2016 | Chen | G06F 11/2094 |
| 11,099,956 | B1 * | 8/2021 | Polimera | G06F 9/45558 |
| 2004/0139125 | A1 * | 7/2004 | Strassburg | G06F 3/067 |
| 2007/0260830 | A1 * | 11/2007 | Faibish | G06F 3/061 711/162 |
| 2009/0254592 | A1 * | 10/2009 | Marinov | G06F 16/119 |
| 2012/0130949 | A1 * | 5/2012 | Picken | G06F 16/128 707/626 |
| 2017/0060702 | A1 * | 3/2017 | Dave | G06F 11/2094 |
| 2017/0262520 | A1 * | 9/2017 | Mitkar | G06F 16/275 |
| 2022/0043774 | A1 * | 2/2022 | Freers | G06F 16/176 |

\* cited by examiner

*Primary Examiner* — Mohammed R Uddin
(74) *Attorney, Agent, or Firm* — Staniford Tomita LLP

(57) ABSTRACT

Upon completing replicating a file set from a source to destination, a snapshot taken of the file set is maintained at the source. The file set includes a namespace file having metadata and other files having content data. Verification is started on the file set replicated to the destination. While the verification is in-progress, a next replication cycle is started. Upon detecting corruption in the namespace file, the next replication cycle is paused and any changes to the file set are rolled back. The snapshot being maintained at the source is fetched. The namespace file having the corruption is replaced with the namespace file from the snapshot being maintained at the source. Other files in the file set having the content data are not replaced.

15 Claims, 13 Drawing Sheets

FAST RECOVERY FOR REPLICATION CORRUPTIONS

TECHNICAL FIELD

The present invention relates generally to information processing systems, and more particularly to file systems.

BACKGROUND

Replication refers to a technique where data in a primary storage system is copied, i.e., replicated, to a secondary storage system. Replication is typically conducted according to a schedule. Replication can help to protect against data loss. For example, if the primary storage system should suffer a failure the data, presumably, can be recovered from the secondary storage system.

It is important that the replicated copy of the data be checked for any corruption. Corruption can arise due to errors or faults when transmitting data from the primary to secondary storage systems, hardware failures, software bugs, dropped packets, impulse noise, external signals disrupting the flow, and random bit errors—just to name a few examples.

When corruption is detected, the replication schedule may be suspended while the corruption is addressed. Traditional approaches to recovering from replication corruptions require an inordinate amount of time. During this time, the primary storage system continues to receive new data, but this data will not be replicated. The lack of timely replication increases an organization's exposure to data loss.

Thus, there is a need for improved systems and techniques to reduce recovery times from replication corruptions.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
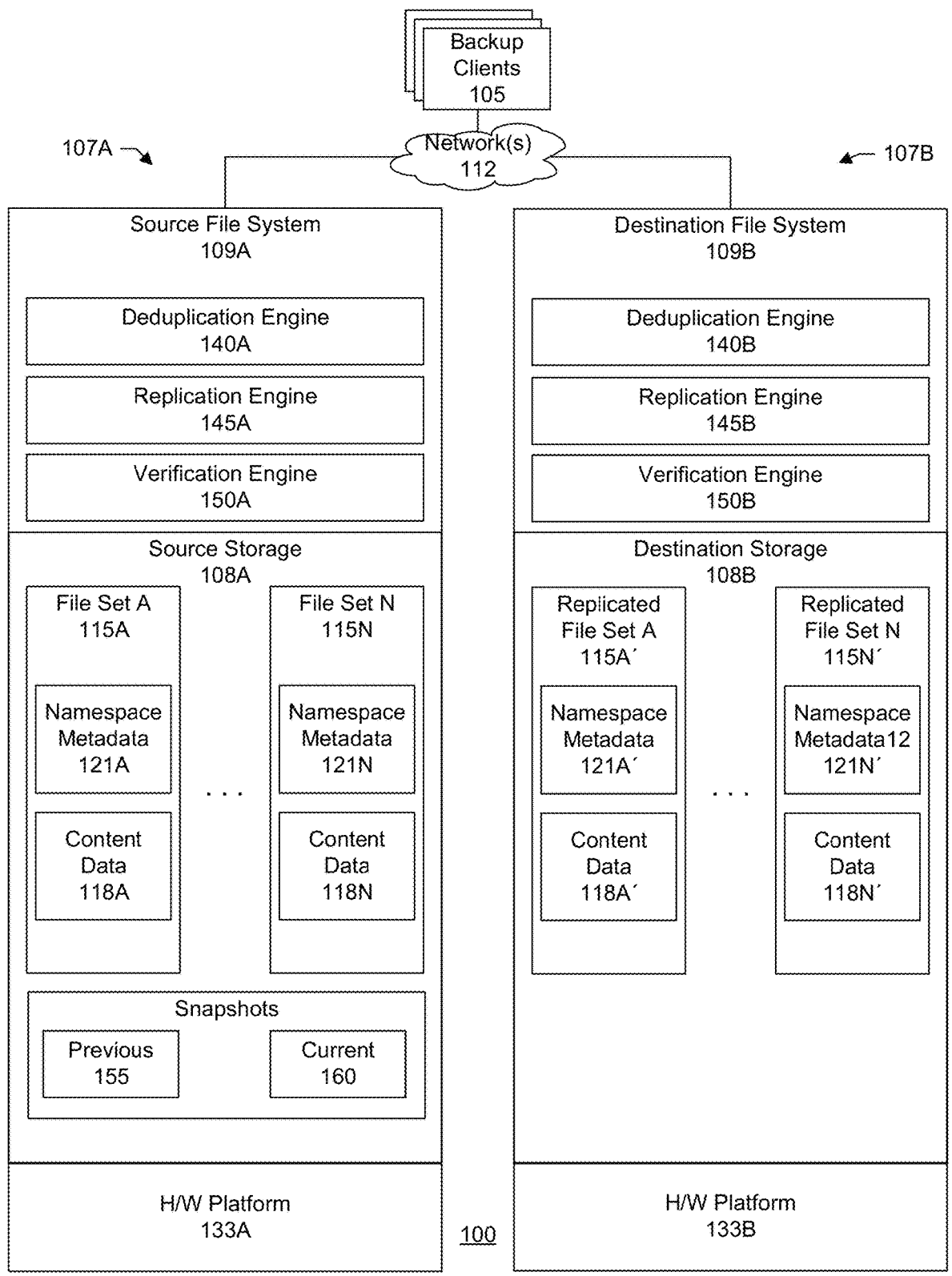
FIG. 1 shows a block diagram of an information processing system for reducing recovery times in connection with replication corruptions, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

FIG. 1 shows a simplified block diagram of an information processing system 100 within which methods and systems for recovering from replication corruptions may be implemented. The example shown in FIG. 1 includes a set of clients 105, a source site 107A having a source storage 108A with source file system 109A, a destination site 107B having a destination storage 108B with destination file system 109B, and a network 112 connecting the components.

In an embodiment, replication is a technique where a file set in a file system (e.g., source file system) is replicated or copied to another file system (e.g., destination file system). For example, source storage is shown as having a file set 115A. The file set has been replicated to destination storage to generate a corresponding replicated file set 115A'. Replicated file set 115A' at the destination is intended to be a copy of file set 115A at the source.

The source and destination file systems are designed to be isolated from each other so as to avoid single points of failure. For example, the destination site may be geographically remote from the source site. The file set at the source file system may be referred to as a primary copy. The corresponding file set as replicated to the destination file system may be referred to as a secondary copy or replicated copy. A replication operation thus synchronizes files of a file set between the source and destination file systems.

A file set includes both content data (e.g., user generated data) 118A and metadata or, more particularly, namespace metadata 121A. The namespace provides, among other things, a directory structure for organizing and locating the content data, pointers to data segments that make up a file belonging to the file set, access permissions, and the like. The namespace metadata represents a very small portion of the overall size of the file set. A relatively small amount of corruption in the metadata, however, can have a disproportionate impact in the content data. For example, 100 MB of corrupted metadata can impact several hundred gigabytes of content data and render the data inaccessible.

Replication can be configured as an on-going process to be performed according to a schedule or at regular periodic intervals. Frequent replications can decrease risks of data loss, but can also be very disruptive to the source file system as compute resources are redirected from servicing production requests to handling replication operations. Less frequent replications can decrease the amount of disruption at the source file system as compute resources can remain dedicated to servicing production requests, but can also result in lengthy replication times during a replication cycle due to the amount of accumulated data that is to be replicated. Long time intervals and replication cycles can also increase the exposure to data loss. In an embodiment, the replication interval is configured as every 15 minutes. The replication interval may be referred to as a replication lag time. The replication lag time can be a user-configurable value and thus be set to any interval of time as desired, e.g., 20, 30, 40, or 60 minutes.

When corruption has been detected in a replicated copy of a file set at the destination file system, it can require an excessive amount of time to recover. During this time, the source file system continues to handle production write requests, but replication is suspended. This can leave incoming data at the source file system unprotected. When replication eventually resumes, there may be a very large amount of accumulated data to replicate. Thus, it can take many days to recover from the corruption. In an embodiment, systems and techniques are provided to reduce the recovery time when corruption is limited to the namespace metadata and thus quickly resume replication. In an embodiment, the systems and techniques involve limiting the resynchronization between the source and destination file systems to the namespace metadata thus excluding the content data. This allows for fixing the corruption in much less time than is typically required and thus enabling a quick return to the normal replication schedule of the source file system.

The clients may be referred to as backup clients. The clients may include servers, desktop computers, laptops, tablets, smartphones, internet of things (IoT) devices, or combinations of these. The network may include a cloud network, local area network (LAN), wide area network (WAN), storage area network (SAN), or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

As discussed, the source site includes source file system 109A. The file system may be hosted by a single node or distributed across multiple nodes as in a cluster configuration. The file system is supported by an underlying hardware platform 133A. Storage may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, or an object or cloud storage service. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. A storage system may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the storage may represent logical storage that includes any number of physical storage devices connected to form a logical storage.

The file system provides organization of data stored in a storage system and presentation of that data to clients and applications in a logical format. In an embodiment, the file system provides backup storage for files belonging to the clients. The file system supports network protocols for accessing remote centrally stored data. An example of such a protocol includes Network File System (NFS). NFS is a distributed file system protocol originally developed by Sun Microsystems in 1984. NFS is an open standard and allows a user on a client computer to access files over a computer network much like local storage is accessed. NFS allows the client computer to mount a remote file system as if it were a local file system. Thus, users—regardless of what workstation they may be using—can have access to their files in a centrally managed manner. Such file systems facilitate document and workspace sharing and data consistency as users on the network will be accessing the same set of files.

Other examples of supported file system protocols allowing for remote access include Common Internet File System (CIFS), Server Message Block (SMB), Data Domain Boost (DDBoost), and others. DDBoost is a system that distributes parts of a deduplication process to the application clients, enabling client-side deduplication for faster, more efficient backup and recovery. A data storage deployment may use any combination of these interfaces simultaneously to store and access data.

The clients, which may be referred to as DDBoost clients, may use the DDBoost backup protocol to conduct backups of client data to the storage system, restore the backups from the storage system to the clients, or perform other data protection operations. The DDBoost library exposes application programming interfaces (APIs) to integrate with a Data Domain system using an optimized transport mechanism. These API interfaces exported by the DDBoost Library provide mechanisms to access or manipulate the functionality of a Data Domain file system. Embodiments may utilize the DDBoost File System Plug-In (BoostFS), which resides on the application system and presents a standard file system mount point to the application. With direct access to a BoostFS mount point, the application can leverage the storage and network efficiencies of the DDBoost protocol for backup and recovery. A client may run any number of different types of protocols.

The file system organizes the data into files and folders into which the files may be stored. When a client requests access to a file, the file system issues a file handle or other identifier for the file to the client. The client can use the file handle or other identifier in subsequent operations involving the file. A namespace of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

In an embodiment, the file system includes any number of file sets 115A-N. The file system may include a set of modules or components offering services such as backup, deduplication, replication, verification, other services, or combinations of these. In the example shown in FIG. 1, the source file system is shown as including a deduplication engine 140A, replication engine 145A, and namespace verification engine 150A.

The deduplication engine is responsible for deduplicating files stored to the file system by the clients. The replication engine is responsible for replicating files, including metadata, from the source site to the destination site. The verification engine is responsible for verifying replicated data. The destination site may be geographically remote from the source site. For example, the source site may be a first data center and the destination site may be a second data center, geographically remote from the first data center. Having replicated copies of data stored at a different site helps to protect against data loss. For example, if source (or primary) site 107A happens to suffer a failure, data replicated to the destination (or secondary) site 107B will be available for restore.

The destination site may likewise include a corresponding file system that may be referred to as destination file system 109B. The destination file system may be similar to source site file system, but within which replicated copies of the source site file system are maintained such as replicated file sets 115A'—N'. These replicated copies may be maintained in an non-editable, non-writable, or read-only format to help ensure that they are not inadvertently modified or changed. The namespace verification engine is responsible for verifying metadata replicated from the source site file system to the destination site file system. It should be appreciated that the blocks shown in FIG. 1 can be functional and there can be many different hardware and software combinations to implement the functions described. Further, it is not necessary that a particular file system have each of the different modules installed. For example, in some cases, deduplication engine 140B shown with the destination file system may be omitted as deduplication of data from the backup clients will be the responsibility of the source file system. As another example, in some cases, verification engine 150A shown with the source file system may be omitted as verification of the replicated copies of the file set will be the responsibility of verification engine 150B at the destination file system.

An example of a file system includes a Data Domain File System (DDFS) on a Data Domain Restorer (DDR) as provided by Dell Technologies of Round Rock, Texas. While some specific embodiments are described in conjunction with storage systems, products, and services provided by Dell, it should be appreciated that the principles and aspects can be applied to other file systems, storage systems, products, and services.

Figure 2:
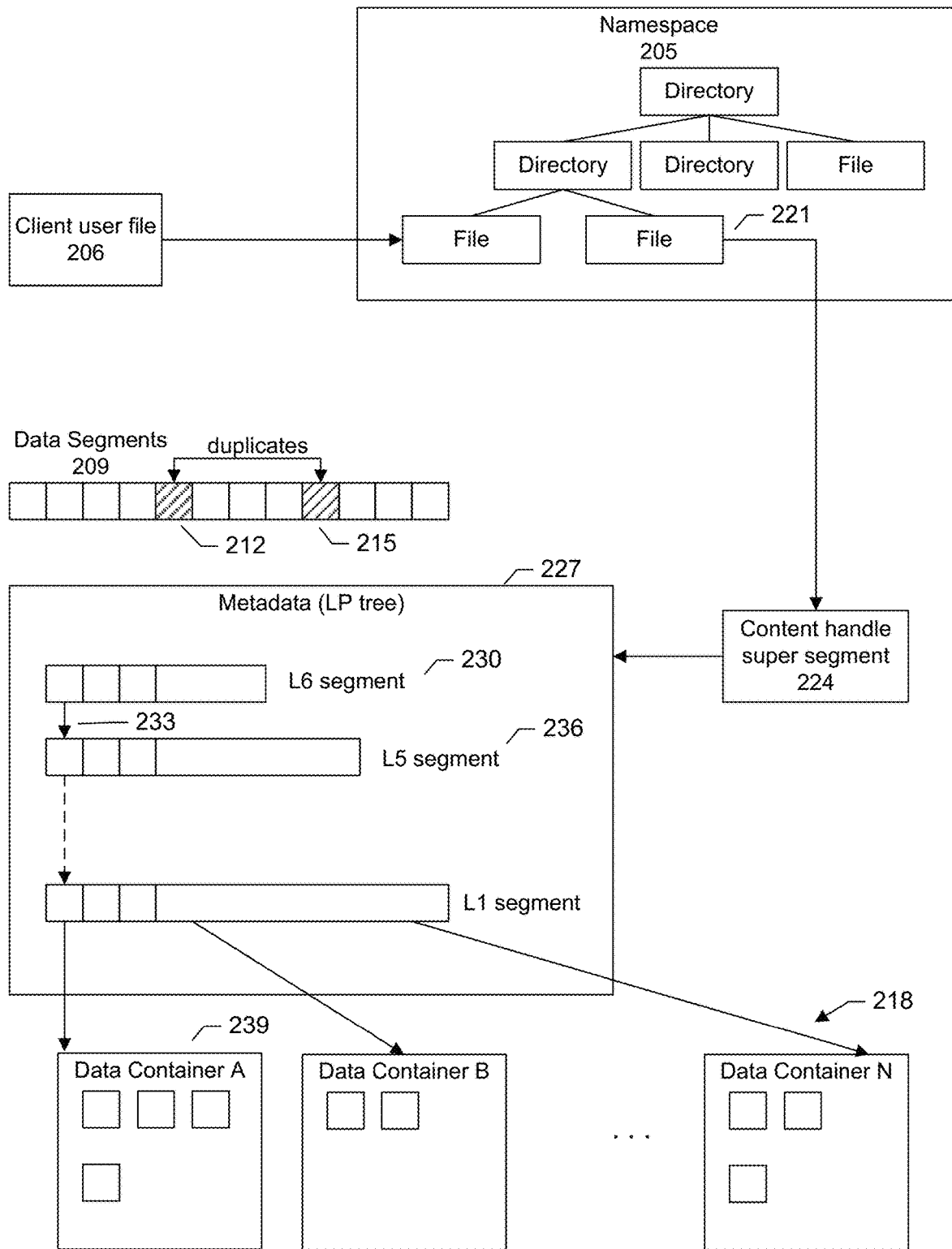
FIG. 2 shows an example of a deduplication process, according to one or more embodiments.

In an embodiment, the file system is a deduplicated file system. The deduplication engine helps to ensure that data already stored, i.e., redundant data, is not again stored. A deduplicated file system is a type of file system that can reduce the amount of redundant data that is stored. FIG. 2 shows a block diagram illustrating a deduplication process of the file system according to one or more embodiments. As shown in the example of FIG. 2, the file system maintains a namespace 205. In an embodiment, each node of a cluster is responsible for a particular portion of the namespace and each node may perform deduplication within its assigned portion of the namespace. Further details of a file system namespace are provided in FIG. 3 and the discussion accompanying FIG. 3.

As data, such as incoming client user file 206, enters the file system, it is segmented into data segments 209 and filtered against existing segments to remove duplicates (e.g., duplicate segments 212, 215). A segment that happens to be the same as another segment that is already stored in the file system may not be again stored. This helps to eliminate redundant data and conserve storage space. Metadata, however, is generated and stored that allows the file system to reconstruct or reassemble the file using the already or previously stored segment. Metadata is different from user data. Metadata may be used to track in the file system the location of the user data within the shared storage pool. The amount of metadata may range from about 2 or 4 percent the size of the user data.

More specifically, the file system maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the fingerprint index. Matching fingerprints indicate that corresponding data segments are already stored. Non-matching fingerprints indicate that the corresponding data segments are unique and should be stored.

Unique data segments are stored in fixed size immutable containers 218. There can be many millions of containers tracked by the file system. The fingerprint index is updated with the fingerprints corresponding to the newly stored data segments. A content handle 221 of the file is kept in the file system's namespace to support the directory hierarchy. The content handle points to a super segment 224 which holds a reference to a top of a tree 227 of the file. The super segment points to a top reference 230 that points 233 to metadata 236 and data segments 239.

In other words, in a specific embodiment, each file in the file system may be represented by a tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes.

In other words, in an embodiment, every segment in the file system is identified by a 24 byte key (or the fingerprint of the segment), including the LP segments. Each LP segment contains references to lower level LP segments.

Figure 3:
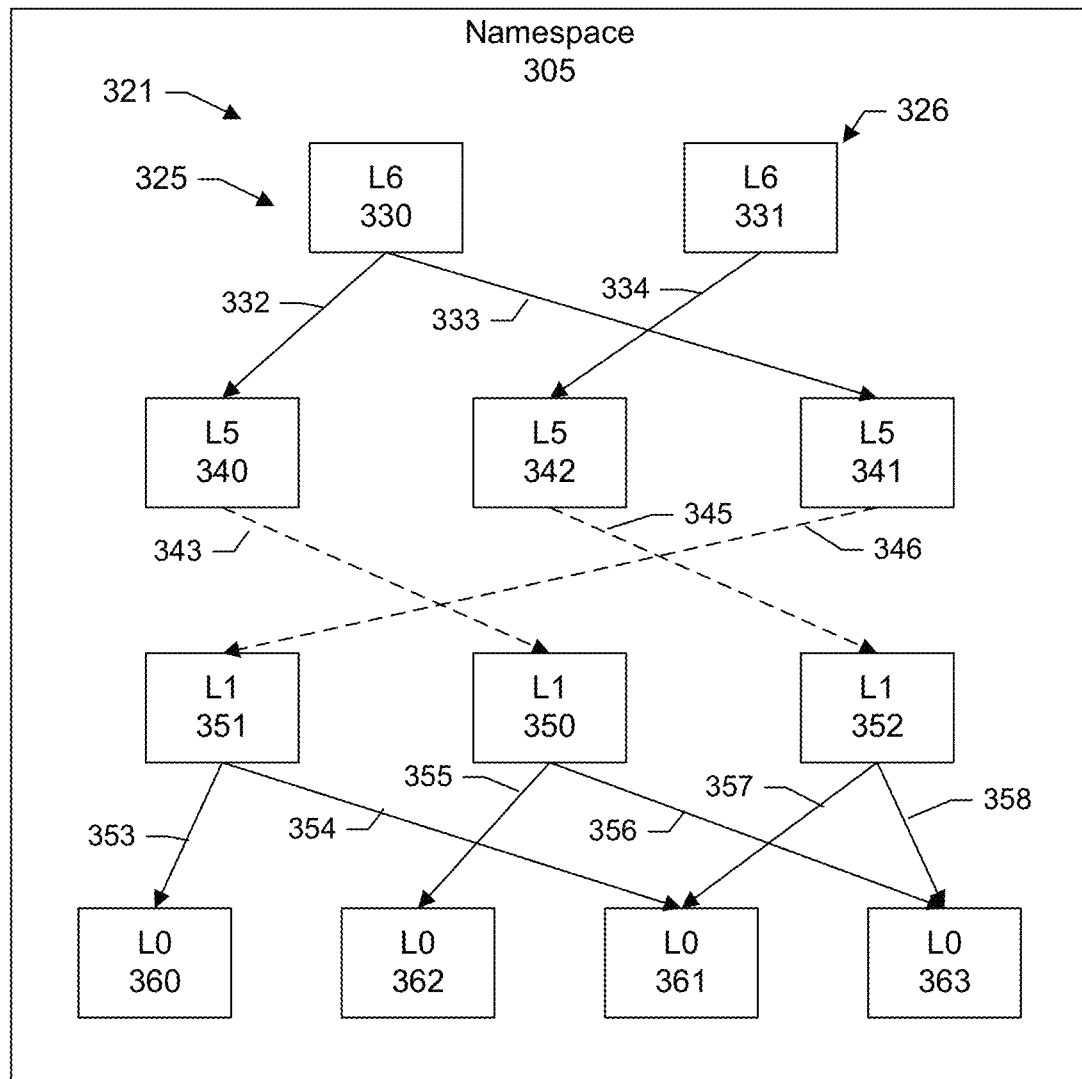
FIG. 3 shows an example of a namespace, according to one or more embodiments.

FIG. 3 shows further detail of a namespace 305 of the file system that may be used to organize the client data stored in the shared storage pool. The namespace includes a set of trees 321 where each file in the file system is represented by a tree. A tree includes a set of segment levels arranged in a hierarchy. In a specific embodiment, a tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper level segments that store metadata (e.g., fingerprints) and may be referred to as LP segments. The lowest level segments are the L0 segments which represent actual data content of the file. An upper level segment references one or more lower level segments. Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references. In other words, lower level segments are referenced by higher level segments.

The example shown in FIG. 3 shows segment levels L6, L5, L1, and L0. Segment levels L4, L3, and L2 have been omitted for purposes of clarity. An L6 segment forms a root or parent. Thus, in the example shown in FIG. 3, there is a first tree 325 having an L6 segment 330 and representing a first file. There is a second tree 326 having an L6 segment 331 and representing a second file.

Two or more files may share a same segment. A lower level segment may be referenced by one or more upper level segments. For example, a lower level segment may be referenced by a first upper level segment, and a second upper level segment. The first upper level segment may be from a first tree representing a first file. The second upper level segment may be from a second tree representing a second file. An upper level segment may reference one or more lower level segments. For example, an upper level segment may reference a first lower level segment and a second lower level segment.

In the example shown in FIG. 3, L6 segment 330 references L5 segments 340, 341 as shown by arrows 332, 333 from L6 330 to L5 340, 341, respectively. L6 segment 331 references L5 segment 342 as shown by an arrow 334 from L6 331 to L5 342. L5 segment 340 references an L1 segment 350 as shown by an arrow 343 from L5 340 to L1 350. L5 segment 342 references L1 segment 352 as shown by arrow 345 from L5 342 to L1 352. L5 segment 341 references L1 segment 351 as shown by an arrow 346 from L5 341 to L1 351. The arrows from the L5 to L1 segment level are shown in broken lines to indicate that there can be other intermediate levels between the L5 and L1 levels.

L1 segment 351 references L0 segments 360, 361 as shown by arrows 353, 354 from L1 351 to L0 360, 361, respectively. L1 segment 350 references L0 segments 362, 363 as shown by arrows 355, 356 from L1 350 to L0 362, 363, respectively. L1 segment 352 references L0 segments 361, 363 as shown by arrow 357, 358 from L1 352 to L0 361, 363, respectively.

In a specific embodiment, an upper level segment includes a fingerprint of fingerprints of one or more lower level segments referenced by the upper level segment. For example, L6 segment 330 includes a finger of fingerprints of L5 segments 340, 341. L6 segment 332 includes a fingerprint of fingerprint of L5 segment 342. L5 segment 340 includes a fingerprint of fingerprint of L1 segment 350. L5 segment 342 includes a fingerprint of fingerprints of L1 segments 351, 352, and so forth.

Referring back now to FIG. 1, modern data centers have a need to reduce, eliminate or minimize the downtime for mission critical storage systems. Downtime can result from disasters such as software bugs which can lead to storage loss. One technique storage systems can use to help mitigate or avoid downtime and data loss is data replication. There are different types of replication, but as far as fault isolation is concerned, there can be two types or two classifications of replication. One is multi-way replication within the same storage system. The other is multi-way replication across different storage systems.

Replication, however, inherently suffers a deficiency of corruption propagation. For example, if an original copy is corrupted, so would be its replicated copy. Among such disruptions driven by corruptions, damage caused by namespace corruptions is lot more severe as compared to data corruptions because a small amount of corrupted namespace metadata can affect a disproportionately large amount of data. For example, in an embodiment, the namespace metadata includes content handles, each content handle having a length of 256 bytes and pointing to the data blocks of a file. The file system may pack multiple content handles (e.g., 100 content handles of 256 bytes each) into a particular block. The loss of that particular block due to corruption can thus result in the loss of many files (e.g., 100 files).

The second deficiency of replication is the implicit requirement that the replicated copy be built solely by and from the source copy. And thus, the replicated copy would not usually be writable. Since the replicated copy is generally not writable or easily editable, it is generally not possible to edit out the corruption.

Whenever such corruptions happen in the replication copies, unless and until the corruption is cured in the replicated copies, data protection that was originally promised and/or expected at the source is at risk. The longer this window is to cure such corruption in the replicated copies, the longer is the exposure to the lack of data protection for the source copies. One of the ways to cure this corruption in the replicated copy is to recreate the replicated copy from the source copy. However, depending on the size of the copy involved, it could take considerable time during which the source is not well protected as it continues to receive traffic. There is a need to shorten the window of exposure and bridge the protection window as quickly as possible. In an embodiment, systems and techniques are provided to exploit the inherent tenets of log structured versioned file systems. As discussed, some embodiments are described in conjunction with the Data Domain File System and it should be appreciated that the principles and aspects discussed can be applied to other file systems. In an embodiment, systems and techniques are focused on the namespace corruption aspect only rather than the data corruption. Namespace corruption is generally considered to be more severe and harder to bridge than data corruption.

In an embodiment, the file system is an enterprise-class file system supporting multiple file sets (e.g., files sets A—N), with each file set working somewhat like a fault-isolated namespace. For example, the Data Domain File System (DDFS) has a construct referred to as an MTree, which provides for a fault-isolated namespace. Though multiple such file sets might share a single storage system, each file set includes its own isolated and self-contained namespace implementation. For example, file set 115A may include namespace metadata 121A and content data 118A (e.g., user generated data) that is separate or different from namespace metadata 121N and content data 118N of file set 115N despite both file sets sharing the same storage system.

As many as 256 separate file sets can exist in each instance of the DDFS. A file set is a set of files which is self-contained and each file set acts as a mount point. Such a construct may offer a variety of features of data management such as snapshots, space management, fault isolation, and so forth, in addition to replication.

A snapshot is a set of pointers for data at a particular point in time. Triggering a snapshot may be accompanied by a temporary pause of I/O write requests and a flushing of memory, cache, or buffer contents to disk. Once a snapshot has been generated, the actual copying or movement of data to a different storage system (e.g., destination storage) can proceed using the snapshot. Snapshots can be created very quickly because they are logical rather than actual copies of data. In particular, a snapshot may include a set of reference markers or pointers to the actual data. During a snapshot operation, a region on storage may be set aside for a snapshot. Snapshots are attractive options for replications because they are designed to be created very quickly while the application is still running (or with little disruption to the application) as snapshots are virtual copies of the data and not the actual copy. For example, it can be much faster to designate an area on disk for a snapshot and use pointers to data as compared to copying the entire actual source data.

There are many ways to generate a snapshot including copy-on-write (COW), redirect-on-write, clone or split mirror, and others. Once the snapshot has been generated, the replication phase during which data is actually copied and transmitted to destination storage can proceed using the snapshot while normal application operations resume.

In an embodiment, snapshots are used to identify changes to a file set so that replication of the file set from the source file system to the destination file system is limited to the changes. For example, as shown in FIG. 1, the source file system may include a previous snapshot 155 taken of a file set at a first point-in-time. There can be a current snapshot 160 taken of the file set at a second point-in-time, after the first point-in-time. The previous and current snapshots can be compared to identify differences between the first and second points-in-time. The differences can then be replicated to the destination file system, thereby synchronizing the file sets or otherwise updating the file set on the destination file system with the latest changes received at the source file system.

Figure 4:
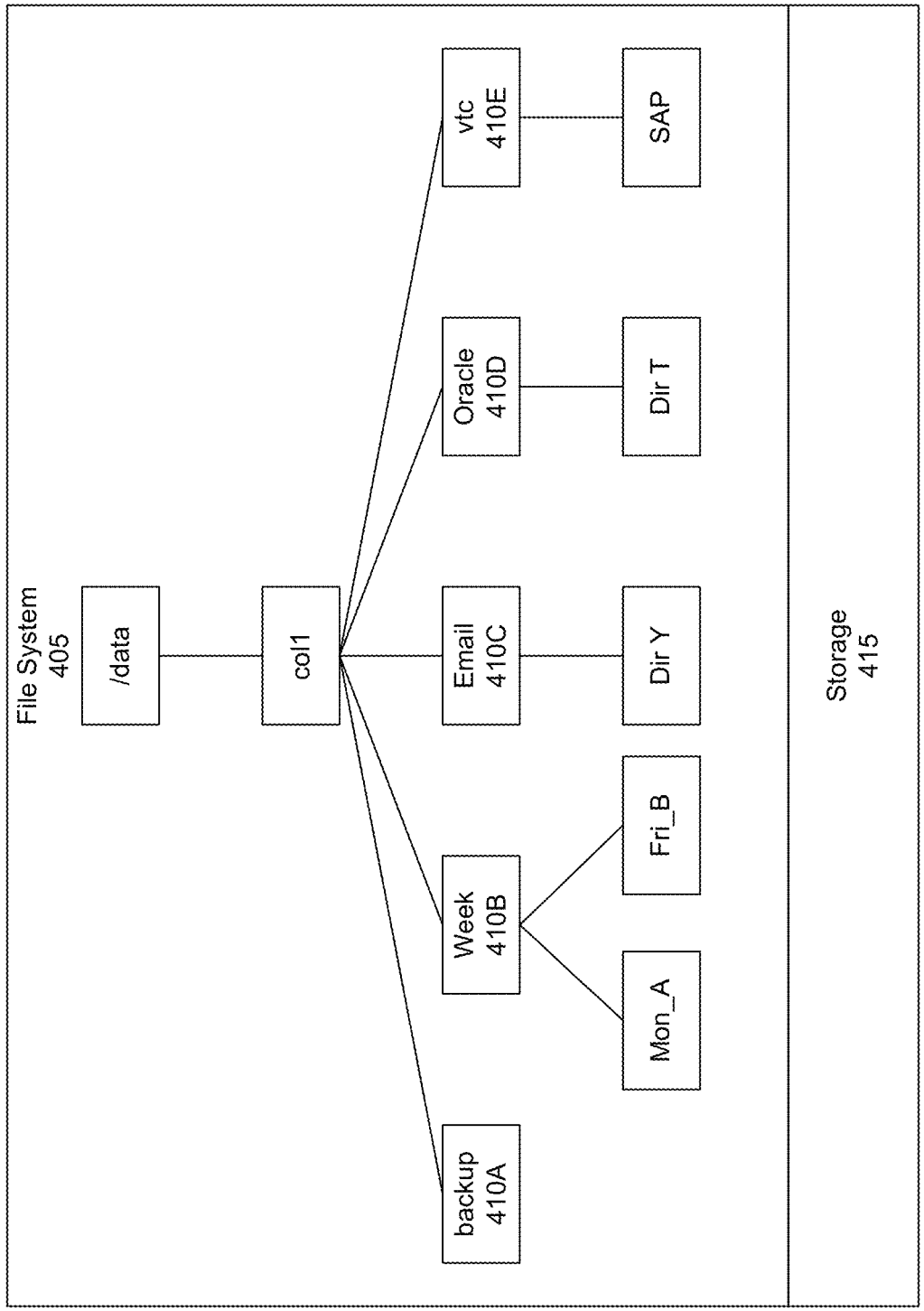
FIG. 4 shows an example of a file system having multiple file sets, according to one or more embodiments.

FIG. 4 shows a more detailed example of a file system 405 with multiple file sets. As shown in the example of FIG. 4, this file system includes a first file set 410A (e.g., "backup"), a second file set 410B (e.g., "Week"), a third file set 410C (e.g., "Email"), a fifth file set 410D (e.g., "Oracle"), and a sixth file set 410E (e.g., "vtc") where their sub-directories and files are located in a single file system, sharing a same storage system 415.

Figure 5:
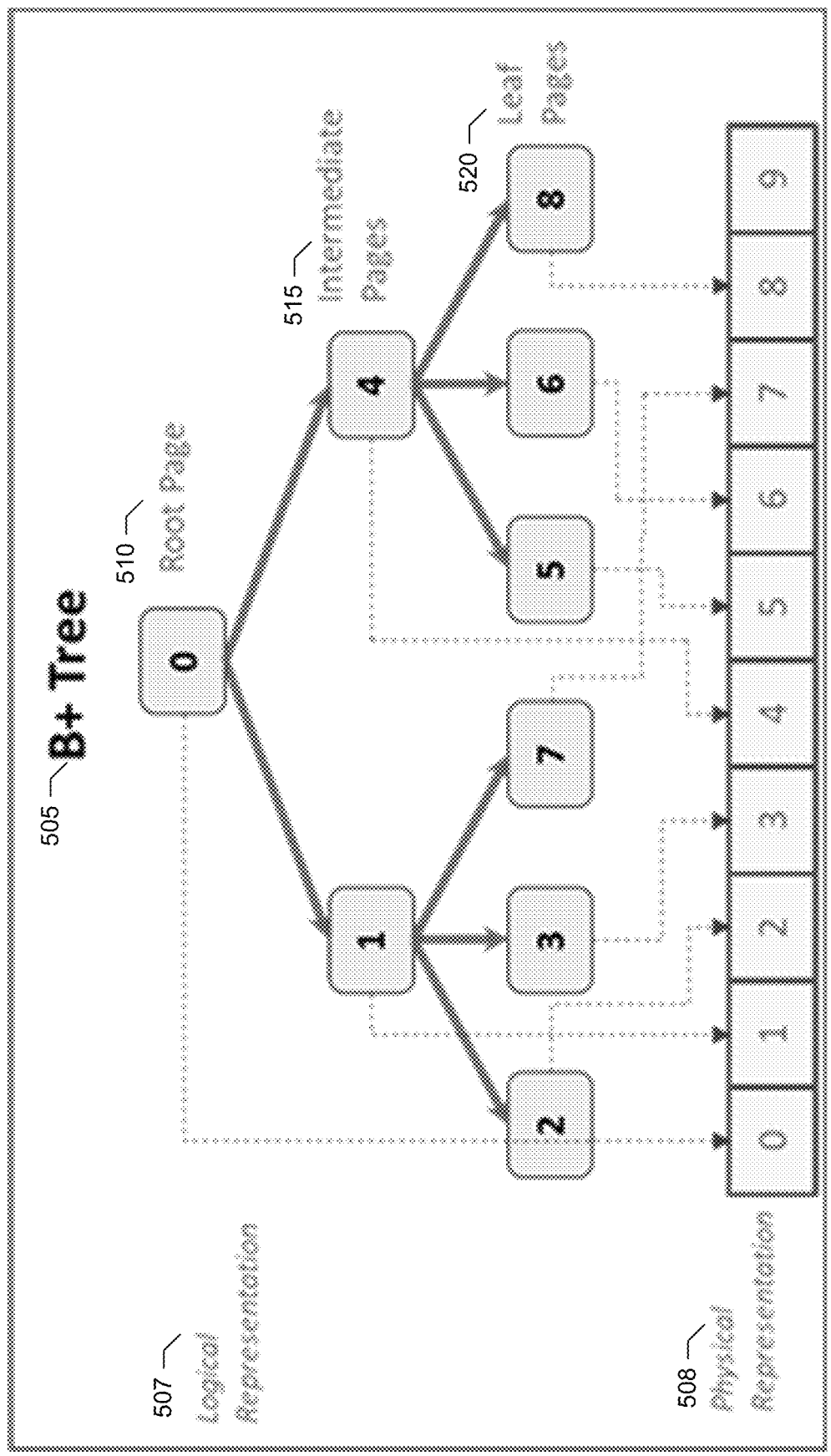
FIG. 5 shows an example of a B+ tree as a flattened on-disk layout, according to one or more embodiments.

FIG. 5 shows an example of a flattened on-disk layout of a B+ tree 505. This example of the B+ tree includes a logical representation 507 and a physical representation 508. The logical representation shows a root page 510, a level of intermediate pages 515 below the root page, and a level of leaf pages 520 below the level of intermediate pages. In an embodiment, file sets are represented internally as B+ tree with three intermediate levels (for simplicity the example shown in FIG. 5 shows a single intermediate level). Granular replication performs operations on the file sets' underlying data structure of the B+ tree. A B+ tree is a balanced tree of fixed depth. Each node in the tree is a fixed size "page" of 64 KB. Pages refer to each other via a "page number" (e.g., 0-8). The physical representation is a linear area of pages that gets written to disk. The B+ tree in flattened form is a single linearly addressed segment of space which means for certain operations it can be traversed quickly.

Figure 6:
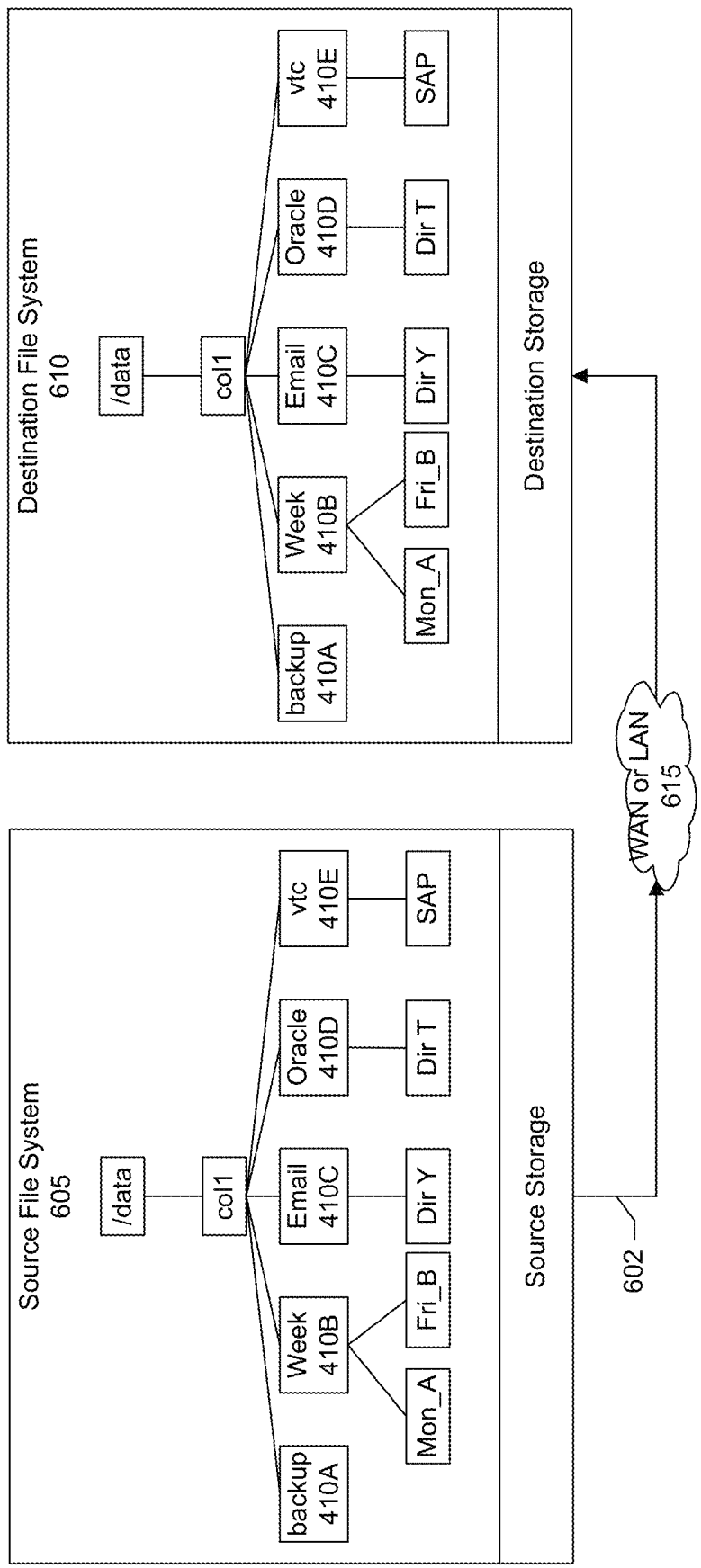
FIG. 6 shows an example of file set replication from a source storage or file system to a destination storage or file system, according to one or more embodiments.

FIG. 6 shows an example of a file set replication operation 602 from a source site file system (e.g., source DDR) 605 to a destination site file system (e.g., destination DDR) 610. A network (e.g., WAN or LAN) 615 connects the source and destination sites. File set replication duplicates an entire file set (e.g., "Email" directory file set or "Oracle" directory file set) from one storage system (e.g., source DDR) to another storage system (e.g., destination DDR). It does not have inherent performance limitations but is limited by the number of file sets supported. In an embodiment, the replication includes an operation referred to as "MRepl." The MRepl operation includes a sequence of snapshots to provide continuous, but time delayed updates from the source to destination.

Figure 7:
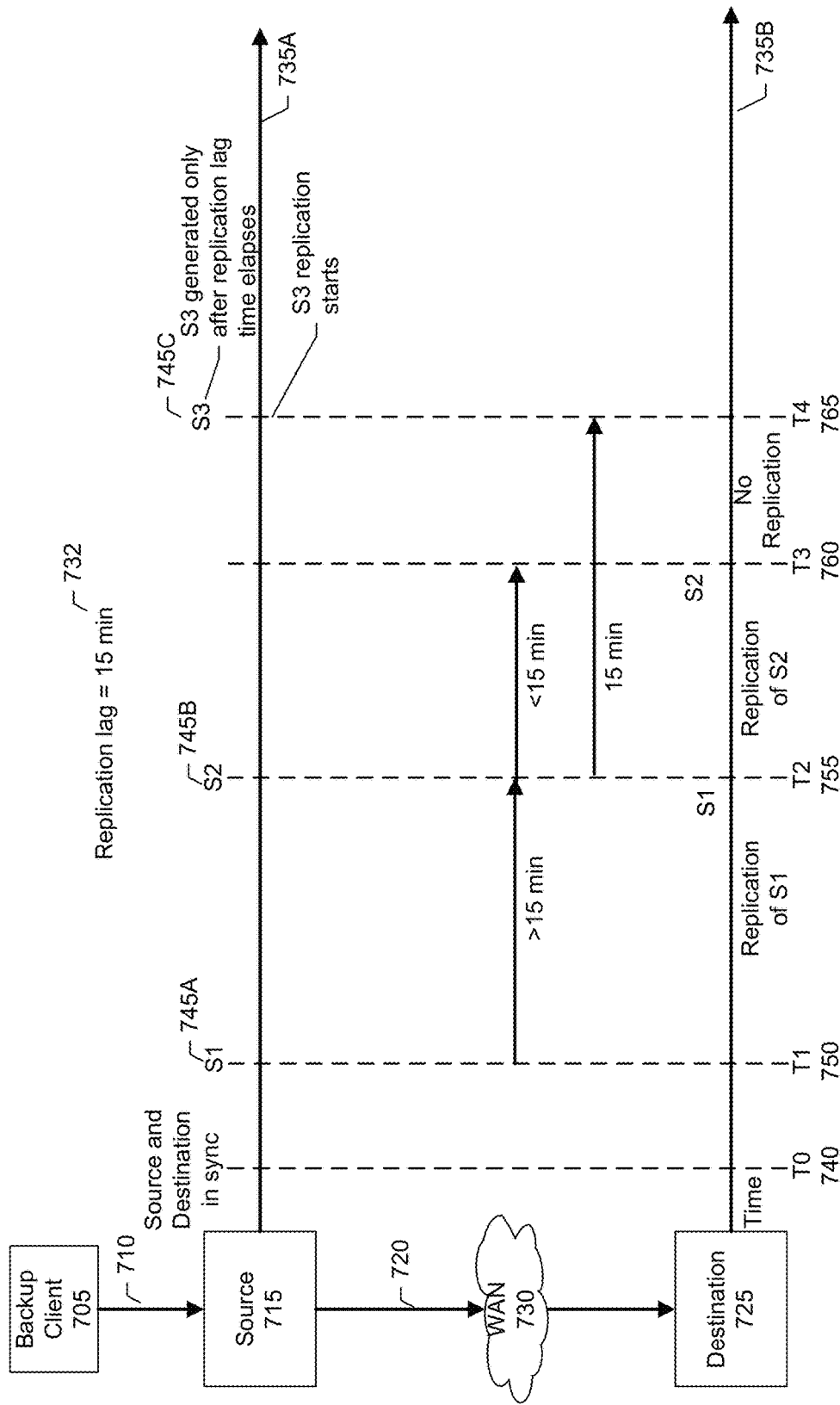
FIG. 7 shows a detailed example of file set replication using periodic system-generated snapshots for change tracking, according to one or more embodiments.

For example, FIG. 7 shows a more detailed block diagram of file set replication within which periodic system-generated snapshots for change tracking are used. In the example shown in FIG. 7, a backup client 705 backs up 710 data to a source storage system 715 which, in turn, replicates 720 the data to a destination storage system 725 that is connected to the source storage system via a WAN 730. Timelines 735A, B are associated with the source and destination storage systems, respectively. In this example, a replication lag time 732 has been configured as 15 minutes. That is, data is not immediately replicated from source storage to destination storage. Instead, there is a lag time of 15 minutes. Replication consumes compute resources (e.g., processing cycles). Having a replication lag helps to balance the competing needs of a storage system that is responsive to client requests while also generating replicated copies.

At an initial state or time T0 740, the source and destination storage systems are in-sync. Thereafter, source storage receives changes (e.g., new backups of data) from the client. To replicate these changes, a first snapshot (S1) 745A is taken of source storage at a time T1 750. The changes at the source are identified or determined by conducting a differencing operation between first snapshot S1 and a previous snapshot of the source. The differencing operation may be referred to as "file set diffing." The changes are then replicated by copying from first snapshot S1 at the source storage system to the destination storage system. A further discussion of "diffing" is provided below.

During the replication of first snapshot S1, the source storage system continues to receive changes (e.g., new backups of data) from the client.

A time T2 755 indicates a replication of first snapshot S1 from the source storage system to the destination storage system as being complete. In this example, a time to complete the replication exceeded 15 minutes. Thus, immediately upon the replication of first snapshot S1 completing, another replication cycle is initiated. That is, a second snapshot S2 745B is taken of the source storage system. A differencing operation between second snapshot S2 and a previous snapshot of source (e.g., first snapshot S1) is conducted to identify the new changes from second snapshot S2 to replicate.

A time T3 760 indicates a replication of second snapshot S2 from the source storage system to the destination storage system as being complete. In this example, a time to complete the replication was less than the 15 minute replication lag time. Thus, the system pauses replication or enters a standby state until 15 minutes from the last snapshot (e.g., second snapshot S2) has elapsed.

Again, during the replication of second snapshot S2 and after completion, the source storage system continues to receive changes (e.g., new backups of data) from the client.

A time T4 765 indicates a lapse of the 15 minute replication lag time and thus another replication cycle is initiated. That is, a third snapshot S3 745C is taken of the source storage system, a snapshot differencing operation is conducted between third snapshot S3 and a previous snapshot of the source (e.g., second snapshot S2), and identified changes replicated from third snapshot S3 to the destination storage system.

In an embodiment, the differencing or file set "diffing" operation identifies changed files including changes to namespace metadata and content data. In an embodiment, when replicating data, only the files which have changed since the last replication are subject to replication. This is effectuated by taking a snapshot at each replication point and then comparing the snapshot (e.g., current snapshot) with the snapshot taken at the previous replication point (e.g., previous snapshot).

Figures 8, 9:
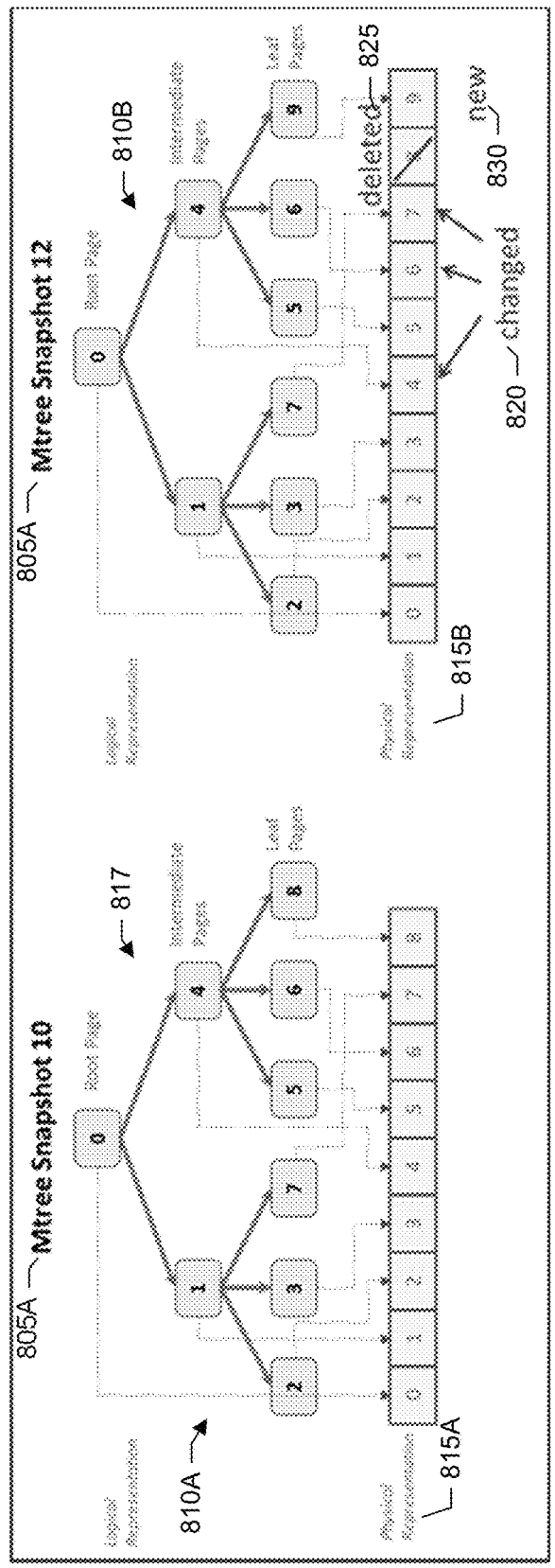
FIG. 8 shows an example of a diffing operation between two snapshots, according to one or more embodiments.
FIG. 9 shows an example of a diffing operation of two snapshots on a per-page basis, according to one or more embodiments.

For example, FIG. 8 shows an example of diffing between two snapshots. As shown in the example of FIG. 8, there is a first snapshot 805A (e.g., Mtree snapshot 10) and a second snapshot 805B (e.g., Mtree snapshot 12). First snapshot 805A includes a logical representation 810A and a physical representation 815A. Second snapshot 805B includes a logical representation 810B and a physical representation 815B. Each snapshot includes multiple pages including intermediate pages and leaf pages 817. The diffing operation identifies modified pages between snapshots and may include changed data 820, deleted data 825, new data 830, or combinations of these.

FIG. 9 shows another example of diffing between two snapshots on a per-page basis. As shown in the example of FIG. 9, there is a first snapshot 905A (e.g., Mtree snapshot 10) and a second snapshot 905B (e.g., Mtree snapshot 12). Last modified snapshot identifications (SIDs) 910A, B are shown for pages of first and second snapshots 905A, B, respectively. In an embodiment, the detection of modified B+ tree pages is done by using the snapshot ID as a hint to skip unmodified pages. Pages identified as modified are then checked key by key for changes. For keys that are identical in value and are of type CHILD they represent the inode of the actual file and source and destination values for that field must be compared. The resulting diff'd file set snapshots 920 then includes of a list of changed keys and payloads which are transmitted for replication purposes. For each key/value pair that is being replicated three possibilities result: CREATE, UPDATE, or REMOVE.

For example, first snapshot 905A includes block number 3 associated with a last modified SID of 9. Second snapshot 905A also includes block number 3, but is associated with a last modified SID of 10. The different SIDs indicate a change to data of an existing block and thus block 3 is added to a list of changes to replicate.

As another example, first snapshot 905A includes block number 5 associated with a last modified SID of 8. Second snapshot 905B also includes block number 5, but is associated with a last modified SID of 10. The different SIDs indicate a change to data of an existing block and block 5 is added to a list of changes to replicate.

As another example, first snapshot 905A includes block number 6 associated with a last modified SID of 8. Second snapshot 905B also includes block number 6, but is associated with a last modified SID of 11. The different SIDs indicate a change to data of an existing block and block 6 is added to a list of changes to replicate.

As another example, second snapshot 905B includes block number 9 associated with a last modified SID of 10. Block number 9 is not listed in first snapshot 905A. Thus, block number 9 is new and is added to a list of changes to replicate.

As another example, first snapshot 905A includes block number 0 associated with a last modified SID of 8. Second snapshot 905B also includes block number 0 associated with a last modified SID of 8. The same last modified SIDs indicate that there has been no changes to data of the block. Thus, block 0 from first snapshot 905A can be skipped from a comparison with block 0 from second snapshot 905B and block 0 is not added to a list of changes to replicate.

In an embodiment, replication of a file system having multiple file sets can be conducted file set-by-file set. A replication configuration may be established from a given file set on the source storage system to another file set on a different storage system. These storage systems may be located in different data centers to improve disaster isolation.

In an embodiment, a replication mechanism includes three phases, namely, a configuration phase, an initialization phase and a replication phase. The first two phases (configuration and initialization) are of one time in nature, whereas in a steady state, it will just be the replication phase.

During the configuration phase, storage administrators assess the storage capabilities of the destination storage system and network bandwidth requirements for data transfer and setup the replication contexts accordingly. During the initialization phase, a special form of replication is triggered so that the entire namespace and the corresponding data belonging to the source file set under the replication context at the time of initiation is transported to the corresponding destination file set as per the context.

In the case of an enterprise file system, the file sets are non-trivially big in size, often running into hundreds of terabytes. And thus, the initialization phase could run for a considerable time. During the initialization phase, the source storage system continues to receive ingest but any such changes to namespace metadata, data, or both will not be part of the data transfer that happens in initialization.

This is where the steady state replication phase comes in that kicks in after initialization is fully complete. A file system may implement the replication phase with the help of file set snapshots. For example, a file system module may take a snapshot at the beginning of the initialization phase and refer its containing namespace and data to the destination file set during initialization phase.

Once initialization phase is complete, the replication module may take a fresh snapshot of the file set that would encapsulate any incremental changes since the initialization snapshot. The replication mechanism may then compare the two snapshots of the namespace, find the differences, and transfer such differences in namespace and data to the destination file set. This process may repeats indefinitely until the replication context is broken (e.g., source site suffers a failure). The replication phase may include transferring a considerable amount data depending on the amount of churn in the source file set. However, file systems that are capable of data deduplication, such as DDFS, can improve the data transfer speeds dramatically by exchanging metadata about the destination file set in what is called as filtering. In the process of filtering, the destination site may inform the source about the data that already exists on at the destination site, based on which the source may limit the amount of data that it should transfer on the wire.

Under steady state in replication, the namespace and its data transfer may be carried out by comparing differences between successive and incremental point in time copies of the namespace. These point-in-time copies may be referred to as snapshots. As explained earlier, even when the amount of change in the source file set is substantial between snapshots, deduplication file systems such as DDFS, can dramatically reduce the time of transfer by reducing the amount of data to be shipped across the wire. However, in the initialization phase, there would be no data in the destination file set at all and thus the entire data and namespace of the source file set must be transported. Since this data can run into hundreds of terabytes, the initialization phase may last for several days. Under normal operations, once the initialization phase is complete the replication times are expected to steadily decrease with each replication cycle or pass towards a steady state phase as only changes to the source file set need to be replicated to the destination.

In a steady state situation, if the destination file set encounters namespace corruption due to any software bugs, storage issues, or other problem conventional file systems repeat the initialization phase, which would again may run several days. During this entire time, the source which has thus far enjoyed protection by replication stands exposed. There is a need to reduce the duration of this window during which the corruption is being addressed.

In an embodiment, systems and techniques are provided for reducing the time that a source storage system remains exposed without replication while namespace corruption errors in a replicated copy are being addressed. In this embodiment, these systems and techniques leverage the following tenets of file systems capable of deduplication such as DDFS:

1) Log structured nature of namespace and data. Both source and destination file systems should support a log structured implementation where new and/or modified portions of namespace and data occupy new storage blocks akin to copy-on-write. Any storage blocks are released for reuse only when the containing namespace is deleted. Unless or until garbage collection runs, and reclaimed deleted blocks are recycled, data is still fully recoverable.

2) Versioned namespace. Generally, a versioned namespace supports snapshots but with the following additional attribute.

3) Serializable namespace. A file system may implement namespace in some form of a B-tree. In an embodiment, there is a file system (e.g., DDFS) that implements such a B-tree as a serializable data file. As far as the data layer of the storage system is concerned, the B-tree content will appear like any other data file. So long as there is a handle implementation to the data of a given file, the same handle implementation can capture the indirection to the content of such B-tree as a serialized file. In the DDFS nomenclature such a handle is referred to as a content handle.

3) Namespace and file system verification. Mission critical filesystems run a variety of integrity checks and background scans to ensure file system namespace and data consistency.

In an embodiment, a versioned namespace provides for successive snapshots which in turn are the respective serialized B-trees with the respective content handles, where the serialized versioned copies of namespace, also referred to as B-trees, share storage blocks in the log structured storage system.

Figure 10:
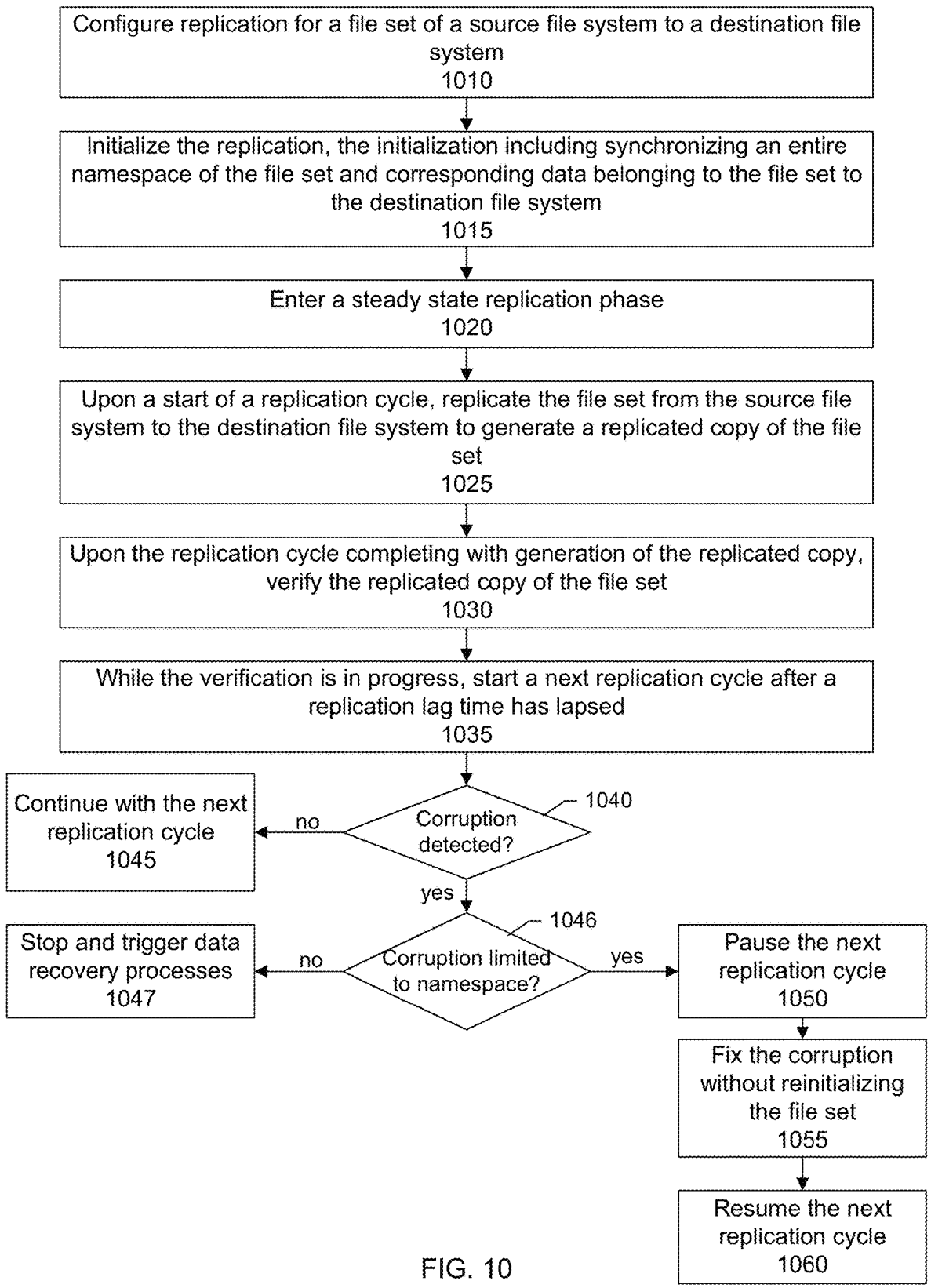
FIG. 10 shows an overall flow for fast recovery from replication corruptions, according to one or more embodiments.

FIG. 10 shows an overall flow for promoting fast recoveries when replication corruptions are detected in the namespace metadata of a replicated file set. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 1010, replication is configured for a file set of a source file system. In an embodiment, configuring the replication may include establishing a replication context that, for example, identifies the file set to be replicated, identifies the destination file system that the file set is to be replicated to, sets a value for the replication lag (e.g., 15 minutes), sets access credentials that may be required for the source, destination, or both, and other replication options.

In a step 1015, the replication is initialized. As discussed, the initialization includes a type of replication that synchronizes from the source file system to the destination file system an entire namespace of the file set and corresponding data belonging to the file set at the source file system.

In a step 1020, once the initialization has been completed, the source file system enters a steady state of replication. That is, in a step 1025, upon a start of a replication cycle, the file set is replicated from the source file system to the destination file system to generate a replicated copy of the file set. In an embodiment, the replication includes taking a snapshot of the source file system at the start of the replication cycle and conducting a differencing operation between the snapshot and a previous or last snapshot taken of the source file system to identify changes. The changes are then replicated from the source snapshot to the destination file system (see, e.g., FIGS. 7-9 and accompanying discussion).

In a step 1030, upon the replication cycle ending with generation of the replicated copy having been completed, the replicated copy is then verified.

In a step 1035, while the verification is in progress, a next replication cycle may be started after the replication lag time has elapsed.

In a step 1040, the verification process or engine at the destination file system is tasked with detecting corruption in the replicated file set. The next replication cycle continues (step 1045) until a corruption is detected. Any competent algorithm or technique may be used to verify the namespace. Examples of verification techniques include low-level block verifications, disk-level verifications, RAID level verifications, application level verifications, calculating checksums, and others.

For example, a checksum is a unique string calculated using a checksum function applied to a block of data. For example, a checksum may be calculated for a data block as it exists in the source file system. Another checksum may be calculated for a replicated copy of the data block as it exists at the destination file system. The checksums can then be compared. Matching checksums indicate that the data blocks are identical. Non-matching checksums indicate that the data blocks are not identical. In other words, the replicated copy is corrupted. For example, one or more error may have been introduced during the transmission of the data block from the source file system to the destination file system.

In a step 1046, if corruption is detected, a determination is made as to whether the corruption is limited to the namespace metadata of the replicated file set. If the corruption is not limited to the namespace metadata of the replicated file set (e.g., corruption in content data detected) the process exits (step 1047) so that a different recovery mechanism can be used such as resynchronizing the content data.

In a step 1050, when the corruption is limited to the namespace metadata of the replicated file set, the next (i.e., currently on-going) replication cycle is paused.

In a step 1055, the corruption in the namespace is fixed without reinitializing the file set. In an embodiment, the fix includes limiting the resynchronization to the namespace. Further discussion is provided below.

In a step 1060, the next replication cycle resumes once the corruption to the namespace is fixed.

Table A below shows further detail of steps for reducing the amount of time the source file system spends without there being replication because corruption detected in a replicated copy at the destination file system is being addressed. In an embodiment, systems and techniques are provided to bridge the replication window back to normal (e.g., steady state) as quickly as possible and ensure disaster protection to the source when a namespace corruption is detected on the destination. Should a corruption happen on the destination, the following procedure should in table A is applied.

TABLE A

| Step | Description |
| --- | --- |
| 1 | A namespace verification engine flags a corruption in the exposed snapshot of the destination file set. Up until this point, there may be an ongoing replication of a given snapshot while the earlier exposed snapshot would have fully landed on the destination file system. Until the ongoing snapshot replication (e.g., current replication) is complete its earlier snapshot (the exposed snapshot) is protected against garbage collection. If there is no specific data corruption flagged beyond the namespace corruption, all the data under the exposed snapshot should be available in the destination storage system. The serialized copy of the namespace corresponding to the exposed, but now corrupted copy of the snapshot of the destination file set is still available and intact on the source. |
| 2 | Fetch this source copy of the serialized namespace onto destination and replace its content handle into the exposed namespace. After this operation the destination file set is rolled back in the middle of the on-going snapshot replication, which may have partially transferred some data as well as namespace that has changed since the last exposed snapshot on the destination. This whole operation can complete substantially faster than full-scale initialization because just one file, namely the serialized namespace file, has to be transferred. |
| 3 | Once the good copy of the namespace is restored on the destination file system, the source file system can immediately resume its on-going steady state replication by snapshot comparison again. |
| 4 | A background verification can be triggered at the destination file system to verify everything is intact both in namespace and its data from the point of view of the source copy that is now installed on destination file set. And since the earlier snapshots that were transferred and installed in the previous cycles are very much intact on destination, file verification based on snapshot diffing can limit the time needed for verification. |

Figure 11:
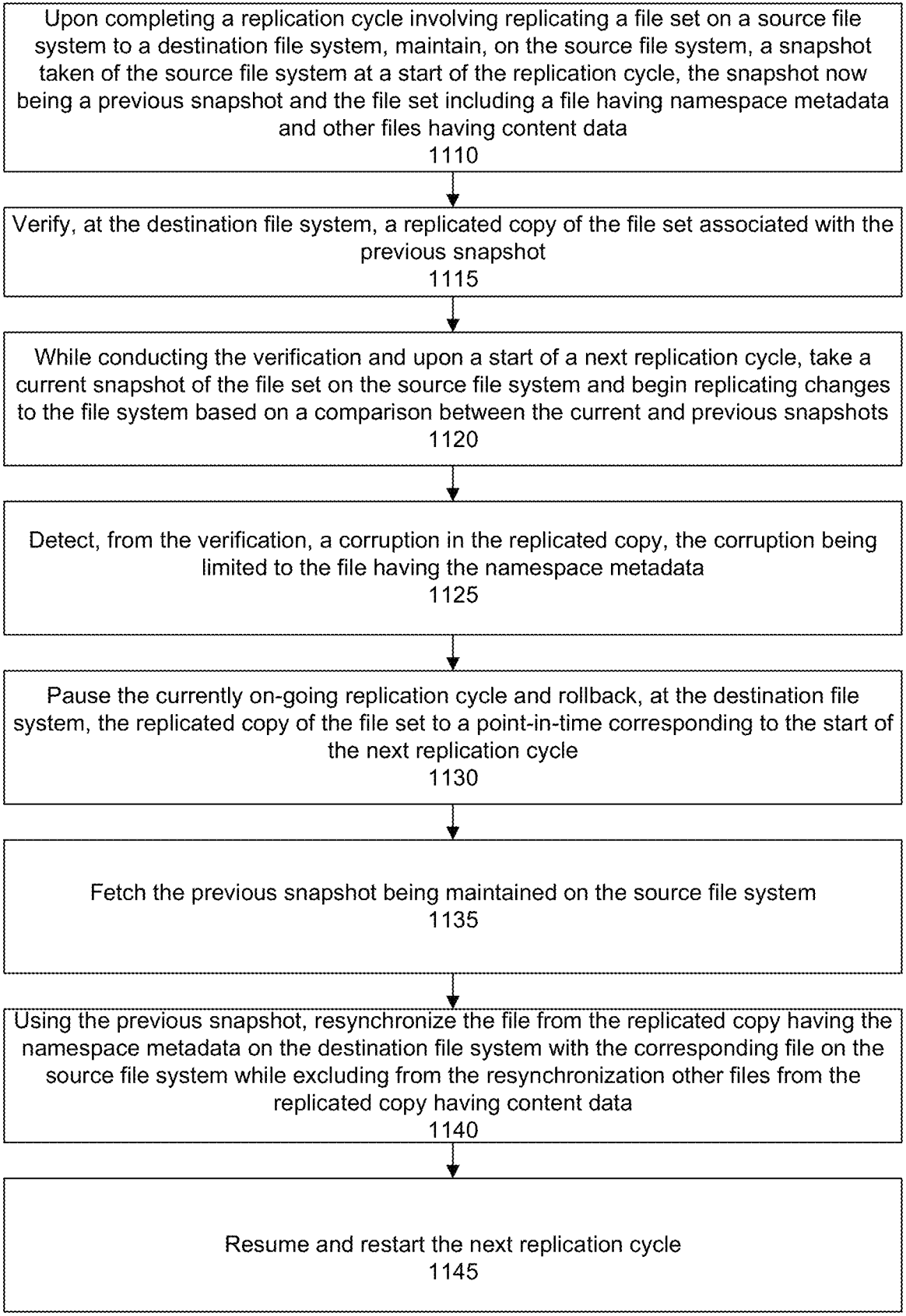
FIG. 11 shows a more detailed flow for fast recovery from replication corruptions, according to one or more embodiments.

FIG. 11 shows another more detailed flow for quickly recovering when namespace corruptions are detected in a replicated copy of a file set. In a step 1105, upon completing a replication cycle involving replicating a file set on a source file system to a destination file system, a snapshot taken of the file set on the source file system at a start of the replication cycle is maintained on the source file system. As discussed, the snapshot of the file set includes a file having namespace metadata and other files having content data. This snapshot may be referred to as a previous snapshot and is protected against garbage collection.

In a step 1115, once the replication is completed a verification process is triggered at the destination file system on the replicated copy of the file set associated with the previous snapshot. The verification process may extend into a next replication cycle.

In particular, in a step 1120, while conducting the verification and upon a start of a next replication cycle, a current snapshot is taken of the file set on the source file system. Changes to the file set are identified via a differencing operation between the current and previous snapshots. The replication engine then begins replicating the changes to the file set to the destination file system.

In a step 1125, based on the verification, corruption is detected in the replicated copy of the file set at the destination file system. In an embodiment, the corruption is limited to the file in the replicated file set having the namespace metadata.

In a step 1130, the currently on-going next replication cycle is paused and the replicated copy of the file set at the destination file system is rolled back to a point-in-time corresponding to the start of the next replication cycle (or previous snapshot).

In a step 1135, the previous snapshot being maintained on the source file system—which contains the file having the namespace metadata and other files having content data—is fetched from the source file system.

In a step 1140, using the previous snapshot, the file on the destination file system having the namespace metadata is resynchronized with the corresponding file on the source file system. The resynchronization, however, excludes the other files from the file set having content data. In other words, the resynchronization replaces the corrupted version of the namespace file on the destination file system with the non-corrupted version of the namespace file from the previous snapshot being maintained on the source file system. Other files of the file set on the destination file system, however, are not replaced. These other files are excluded from replacement.

In a step 1145, once the resynchronization is completed, the next replication cycle can resume and be restarted.

Figure 12:
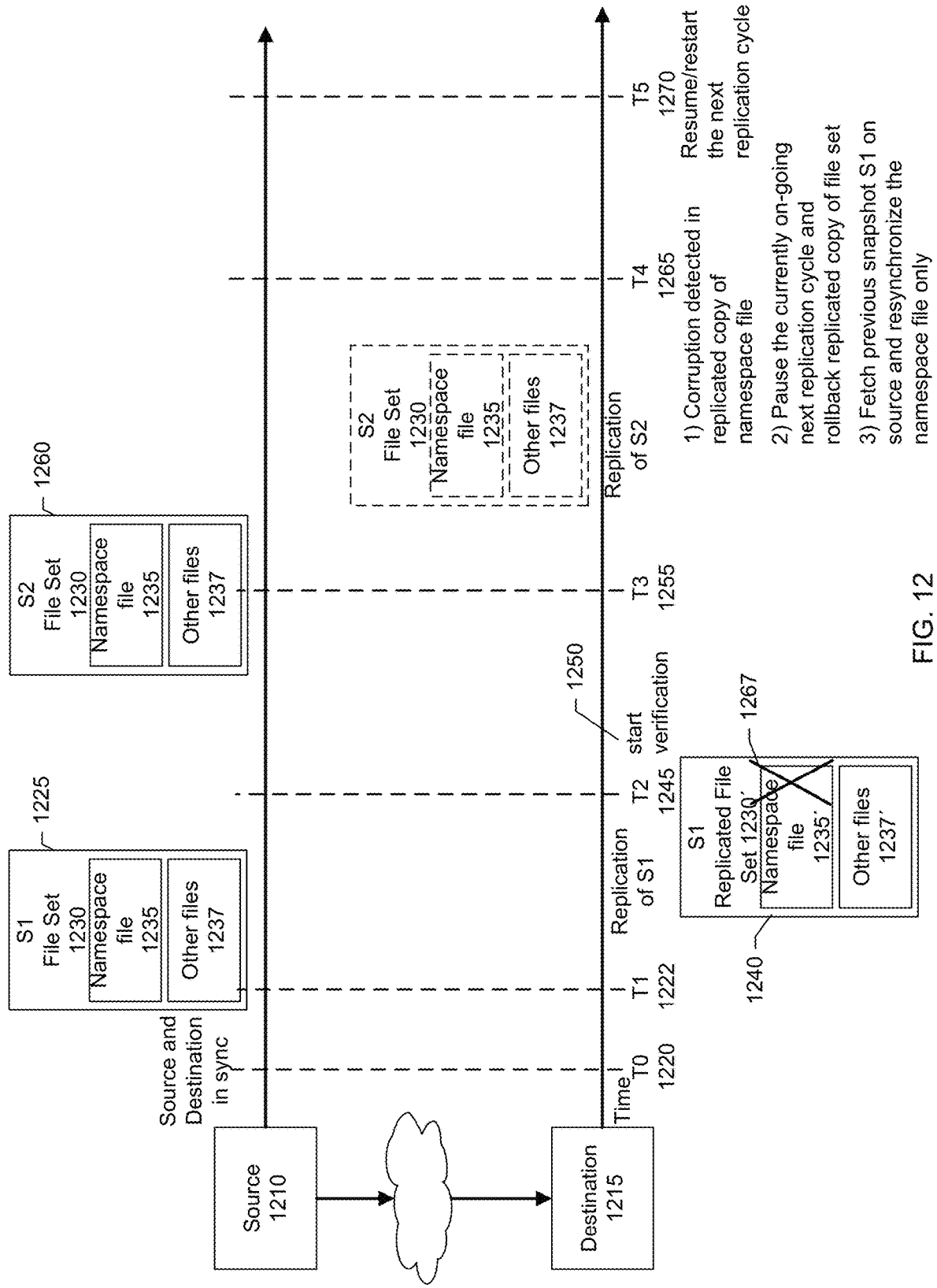
FIG. 12 shows an example of fast recovery from replication corruptions, according to one or more embodiments.

FIG. 12 shows a block diagram of an example for quickly recovering when namespace corruptions are detected in a replicated copy of a file set. In the example shown in FIG. 12, a source storage or file system 1210 replicates data to a destination storage or file system 1215. At an initial state or time T0 1220, the source and destination file systems are in synch. At a time T1 1222, after the initial time, a first snapshot S1 1225 is taken of a file set 1230 at the source file system. The file set includes a file 1235 containing namespace metadata and other files 1237 containing content data.

Using the first snapshot S1, the file set is replicated to the destination file system to generate a replicated copy 1240 of the file set. A time T2 1245 indicates a completion of having generated the replicated copy of the file set at the destination file system. The completion triggers a start of a verification process 1250 on the replicated copy of the file set. First snapshot S1 is maintained at the source file system. In other words, even though first snapshot S1 (with file set 1230 including namespace file 1235 and other files 1237) have been replicated to the destination file system, first snapshot S1 at the source file system will not be flagged or otherwise indicated for garbage collection. First snapshot S1 at the source file system may be marked for preservation. The source file system may continue to receive new writes. Since the source file system is a log structured file system, however, the new writes are written to new blocks thus preserving, in particular, the namespace file on the source file system associated with first snapshot S1. The namespace file associated with first snapshot S1 on the source file system is prevented from being overwriting with the new writes.

A time T3 1255 indicates a start of next replication cycle. The verification may still be in-progress. The start of the next replication cycle is accompanied by a taking of a second snapshot S2 1260 of the file set at the source file system.

A differencing operation is conducted between the first and second snapshots to identify changes in the file set including changes to the namespace file and other files containing content. The changes are then replicated from the source file system to the destination file system.

Second snapshot S2 is shown in broken lines at the destination file system to indicate that replication of the changes from second snapshot S2 at the source file system to the destination file system is currently on-going or in-progress. Meanwhile, at a time T4 1265 a corruption has been detected in replicated copy 1240 of the file set at the destination file system. The corruption is limited to the namespace file. FIG. 12 shows an "X" 1267 adjacent to the namespace file of the replicated copy at the destination file system to indicate the corruption.

Upon detecting the corruption, a series of events are triggered. In particular, the next or currently on-going replication cycle is paused and the in-progress file set at the destination file system associated with second snapshot S2 is rolled back to a point-in-time corresponding to the start of the next replication cycle (or previous first snapshot S1).

The previous first snapshot S1 being maintained on the source file system is fetched and a resynchronization operation is started on the namespace file associated with first snapshot S1. For example, the destination file system may issue commands to the source file system instructing the source file system to retrieve first snapshot S1 and resend the namespace file associated with first snapshot S1. The destination file system withholds commands to the source file system to resend the other files associated with the first snapshot containing data content.

The resynchronization may include copying an entirety of the namespace file from first snapshot S1 on the source file system to the destination file system. For example, corruption may be the result of a changed block from first snapshot S1 of the source file system improperly overwriting an existing block of the destination file system, a new block from first snapshot S1 of the source file system not having been written to the destination file system, or other issue. The resynchronization replaces the corrupted version of the namespace file on the destination file system with the non-corrupted version of the namespace file on the source file system.

As discussed, however, the resynchronization is limited to the namespace file of the replicated copy of the file set at the destination file system. Other files in the replicated copy of the file set are excluded or omitted from the resynchronization operation. The data content of the other files at the source file system are not retransmitted to the destination file system. The other files in the replicated copy of the file set at the destination file system remain as they were at time T1 marking the completion of having generated the replicated copy at the destination file system.

A time T5 1270 marks an end of the resynchronization of the corrupted version namespace file on the destination file system with the non-corrupted version of the namespace file on the source file system. Once the resynchronization has ended, the next replication cycle can immediately resume and restart.

As discussed, other files of the file set from previous first snapshot S1 containing content data are excluded from the resynchronization operation. Thus, the time needed to resynchronize or the duration between time T4 (when corruption is detected) and T5 (when resynchronization of the namespace file is complete) is very short. In other words, rather than repeating a full initialization that may potentially involve many hundreds of thousands or even millions of files from the file set of first snapshot S1, the initialization is limited to a single file—i.e., the serialized namespace file containing the metadata—thus allowing the transfer or transmission from the source file system to the destination file system to be completed very quickly.

Figure 13:
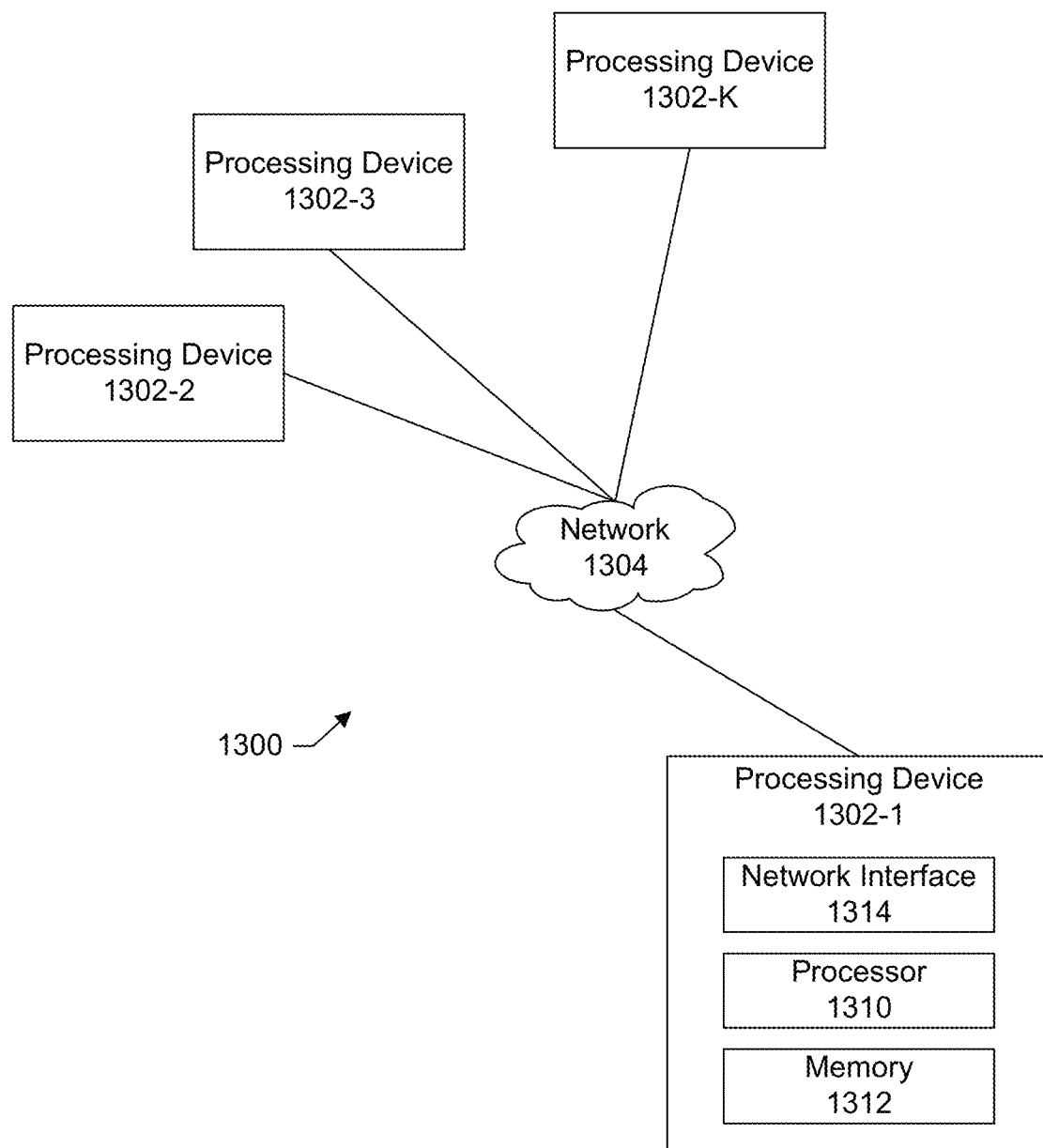
FIG. 13 shows a block diagram of a processing platform that may be utilized to implement at least a portion of an information processing system, according to one or more embodiments.

FIG. 13 shows an example of a processing platform 1300 that may include at least a portion of the information handling system shown in FIG. 1. The example shown in FIG. 13 includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA) or other type of processing circuitry, as well as portions or combinations of such circuitry elements.

The memory 1312 may comprise random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 14:
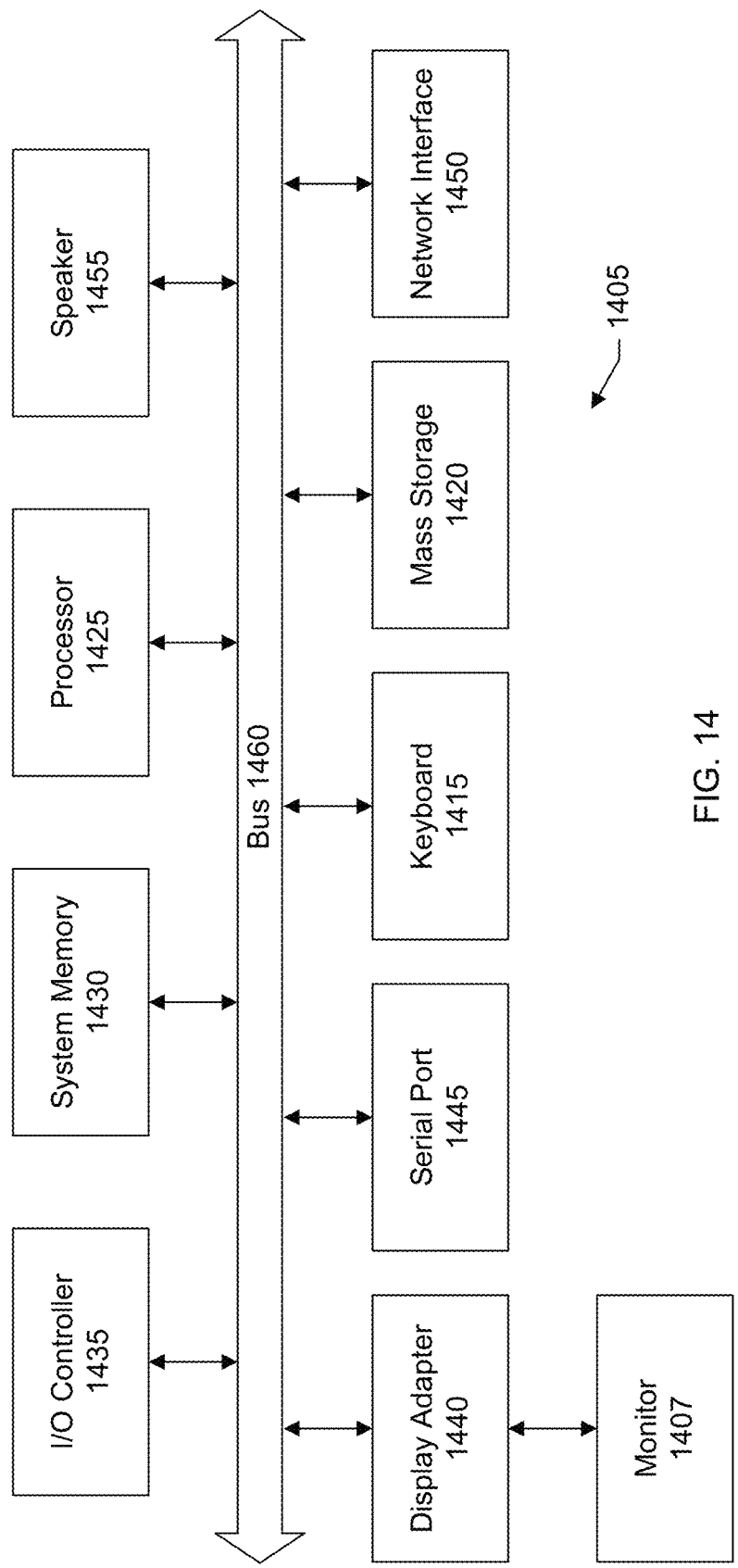
FIG. 14 shows a block diagram of a computer system suitable for use with the system, according to one or more embodiments.

FIG. 14 shows a system block diagram of a computer system 1405 used to execute the software of the present system described herein. The computer system includes a monitor 1407, keyboard 1415, and mass storage devices 1420. Computer system 1405 further includes subsystems such as central processor 1425, system memory 1430, input/output (I/O) controller 1435, display adapter 1440, serial or universal serial bus (USB) port 1445, network interface 1450, and speaker 1455. The system may also be used with computer systems with additional or fewer subsystems. For example, a computer system could include more than one processor 1425 (i.e., a multiprocessor system) or a system may include a cache memory.

Arrows such as 1460 represent the system bus architecture of computer system 1405. However, these arrows are illustrative of any interconnection scheme serving to link the subsystems. For example, speaker 1455 could be connected to the other subsystems through a port or have an internal direct connection to central processor 1425. The processor may include multiple processors or a multicore processor, which may permit parallel processing of information. Computer system 1405 shown in FIG. 14 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    upon completing a replication cycle comprising replicating a file set from a source file system to a destination file system, maintaining, at the source file system, a snapshot taken of the file set, wherein the file set comprises a namespace file having metadata and other files having content data, the snapshot now being a previous snapshot;
    wherein the metadata of the namespace file comprises pointers to the content data of the other files, access permissions for the other files, and describes a directory structure within which the other files are organized;
    starting a verification of the file set replicated to the destination file system;
    while the verification is in-progress, starting a next replication cycle of the file set;
    detecting, from the verification, a corruption in the namespace file of the file set;
    pausing the next replication cycle and rolling back, at the destination file system, any changes to the file set associated with the next replication cycle;
    fetching the previous snapshot being maintained at the source file system; and
    replacing, at the destination file system, the namespace file having the corruption with the namespace file from the previous snapshot being maintained at the source file system, while excluding replacing the other files in the file set having the content data.

2. The method of claim 1 wherein the corruption is limited to the namespace file, the corruption thereby not being detected in the other files of the file set.

3. The method of claim 1 wherein the source and destination file systems comprise log structured file systems.

4. The method of claim 1 wherein the snapshot taken of the file set is maintained at the source file system until at least the verification of the file set has been completed.

5. The method of claim 1 wherein the source file system continues to receive new writes while the snapshot taken of the file set is being maintained on the source file system.

6. A system comprising: a processor; and memory configured to store one or more sequences of instructions which, when executed by the processor, cause the processor to carry out the steps of:
    upon completing a replication cycle comprising replicating a file set from a source file system to a destination file system, maintaining, at the source file system, a snapshot taken of the file set, wherein the file set comprises a namespace file having metadata and other files having content data, the snapshot now being a previous snapshot;
    wherein the metadata of the namespace file comprises pointers to the content data of the other files, access permissions for the other files, and describes a directory structure within which the other files are organized;
    starting a verification of the file set replicated to the destination file system;
    while the verification is in-progress, starting a next replication cycle of the file set;
    detecting, from the verification, a corruption in the namespace file of the file set;
    pausing the next replication cycle and rolling back, at the destination file system, any changes to the file set associated with the next replication cycle;
    fetching the previous snapshot being maintained at the source file system; and
    replacing, at the destination file system, the namespace file having the corruption with the namespace file from the previous snapshot being maintained at the source file system, while excluding replacing the other files in the file set having the content data.

7. The system of claim 6 wherein the corruption is limited to the namespace file, the corruption thereby not being detected in the other files of the file set.

8. The system of claim 6 wherein the source and destination file systems comprise log structured file systems.

9. The system of claim 6 wherein the snapshot taken of the file set is maintained at the source file system until at least the verification of the file set has been completed.

10. The system of claim 6 wherein the source file system continues to receive new writes while the snapshot taken of the file set is being maintained on the source file system.

11. A computer program product, comprising a non-transitory computer-readable medium having a computer-readable program code embodied therein, the computer-readable program code adapted to be executed by one or more processors to implement a method comprising:
    upon completing a replication cycle comprising replicating a file set from a source file system to a destination file system, maintaining, at the source file system, a snapshot taken of the file set, wherein the file set comprises a namespace file having metadata and other files having content data, the snapshot now being a previous snapshot;

wherein the metadata of the namespace file comprises pointers to the content data of the other files, access permissions for the other files, and describes a directory structure within which the other files are organized;

starting a verification of the file set replicated to the destination file system;

while the verification is in-progress, starting a next replication cycle of the file set;

detecting, from the verification, a corruption in the namespace file of the file set;

pausing the next replication cycle and rolling back, at the destination file system, any changes to the file set associated with the next replication cycle;

fetching the previous snapshot being maintained at the source file system; and replacing, at the destination file system, the namespace file having the corruption with the namespace file from the previous snapshot being maintained at the source file system, while excluding replacing the other files in the file set having the content data.

12. The computer program product of claim 11 wherein the corruption is limited to the namespace file, the corruption thereby not being detected in the other files of the file set.

13. The computer program product of claim 11 wherein the source and destination file systems comprise log structured file systems.

14. The computer program product of claim 11 wherein the snapshot taken of the file set is maintained at the source file system until at least the verification of the file set has been completed.

15. The computer program product of claim 11 wherein the source file system continues to receive new writes while the snapshot taken of the file set is being maintained on the source file system.

* * * * *